United States Patent
Kwon et al.

(10) Patent No.: US 10,920,900 B2
(45) Date of Patent: Feb. 16, 2021

(54) FUEL SUPPLY VALVE FOR FUEL CELL SYSTEM

(71) Applicant: Hyundai Motor Company, Seoul (KR)

(72) Inventors: Bu Kil Kwon, Gyeonggi-oo (KR); Se Kwon Jung, Seoul (KR); Hyo Sub Shim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 15/364,686

(22) Filed: Nov. 30, 2016

(65) Prior Publication Data

US 2018/0023722 A1 Jan. 25, 2018

(30) Foreign Application Priority Data

Jul. 22, 2016 (KR) .................. 10-2016-0093242

(51) Int. Cl.
*F16K 31/06* (2006.01)
*B64D 41/00* (2006.01)

(52) U.S. Cl.
CPC .... *F16K 31/0655* (2013.01); *B64D 2041/005* (2013.01)

(58) Field of Classification Search
CPC ............. F16K 31/0655; F16K 31/0658; F16K 39/022; F16K 31/069; F16K 31/0693; F16K 31/0606; F16K 31/0651; F16K 27/02; F16K 1/34; F02M 3/075; B64D 2041/005; H01M 2250/20; H01M 8/04089; H01M 8/04104; Y02E 60/50
USPC ..... 251/129.07, 50, 282; 137/871, 862, 870, 137/614.19, 614.11
See application file for complete search history.

(56) References Cited

U.S. PATENT DOCUMENTS

| | | | | |
|---|---|---|---|---|
| 3,601,147 A | * | 8/1971 | Myers | F16K 39/022 251/282 |
| 3,680,832 A | * | 8/1972 | Uliczky | F16K 39/00 251/282 |
| 3,684,238 A | * | 8/1972 | Michellone | F16K 31/0658 251/129.07 |
| 4,595,170 A | * | 6/1986 | Livet | F16K 47/00 251/129.01 |
| 5,823,505 A | * | 10/1998 | Stoll | F16K 31/0693 251/129.07 |
| 6,641,110 B1 | * | 11/2003 | Nguyen | F16J 15/48 251/281 |
| 6,935,616 B2 | * | 8/2005 | Baumann | F16K 39/022 137/614.18 |
| 8,118,054 B2 | * | 2/2012 | Glaudel | F16K 1/385 137/270 |

(Continued)

FOREIGN PATENT DOCUMENTS

| | | |
|---|---|---|
| JP | 2007-303559 A | 11/2007 |
| JP | 2009-176498 A | 8/2009 |

(Continued)

*Primary Examiner* — Umashankar Venkatesan
*Assistant Examiner* — Andrew J Rost
(74) *Attorney, Agent, or Firm* — Mintz Levin Cohn Ferris Glovsky and Popeo, P.C.; Peter F. Corless

(57) ABSTRACT

A fuel supply valve is provided. The fuel supply valve includes a housing of the valve, a plunger and a hollow part. A cavity where the plunger moves is formed at one side of the housing and a contact area is formed between the housing and the plunger based on the movement of the plunger. Accordingly, fuel flow in the cavity is limited by the contact.

16 Claims, 6 Drawing Sheets

(56) References Cited

U.S. PATENT DOCUMENTS

| | | | |
|---|---|---|---|
| 8,221,923 B2 * | 7/2012 | Inai | H01M 8/04097 |
| | | | 429/429 |
| 2007/0228311 A1 * | 10/2007 | Beneker | F16K 31/0665 |
| | | | 251/129.07 |
| 2009/0169963 A1 | 7/2009 | Takeshita | |
| 2013/0095398 A1 | 4/2013 | Kato | |
| 2013/0206257 A1 | 8/2013 | Okawachi | |
| 2015/0090912 A1 * | 4/2015 | Buse | F16K 1/36 |
| | | | 251/129.07 |
| 2015/0337769 A1 | 11/2015 | Yoshioka | |
| 2016/0102766 A1 * | 4/2016 | Ristau | F16K 1/42 |
| | | | 251/333 |

FOREIGN PATENT DOCUMENTS

| | | |
|---|---|---|
| JP | 2010-001916 A | 1/2010 |
| JP | 2010-534815 A | 11/2010 |
| JP | 2013-093255 A | 5/2013 |
| KR | 10-2013-0132573 A | 12/2013 |
| KR | 10-2014-0019026 A | 2/2014 |

\* cited by examiner

– Prior Art –

FUEL SUPPLY VALVE FOR FUEL CELL SYSTEM

CROSS-REFERENCE TO RELATED APPLICATION

This application claims priority to Korean Patent Application No. 10-2016-0093242, filed on Jul. 22, 2016 in the Korean Intellectual Property Office, the disclosure of which is incorporated herein by reference.

BACKGROUND

1. Field of the Invention

The present invention relates to a fuel supply valve for a fuel cell system, more particularly, to a fuel supply valve for a fuel cell system in which high pressure fuel introduced through a hollow part of a plunger pressurizes the plunger, thereby improving airtightness of the valve.

2. Description of the Related Art

In general, a fuel cell system includes a fuel cell stack that generates electrical energy, a fuel supply system that supplies fuel (hydrogen) to the fuel cell stack, an air supply system that supplies oxygen of air, that is, an oxidizer which is necessary for electrochemical reaction, and a heat and water control system that adjusts an operating temperature of the fuel cell stack.

The fuel supply system, namely, a hydrogen tank of a hydrogen supply system stores high-pressure compressed hydrogen at about 700 bar. After the stored compressed hydrogen is discharged through a high-pressure line according to on/off of a high-pressure controller mounted at an inlet of the hydrogen tank, the compressed hydrogen is decompressed through a starting valve and a hydrogen supply valve to supply hydrogen to the fuel cell stack.

In other words, hydrogen of the hydrogen tank having high-pressure of 700 bar is decompressed to 20 bar or less by first decompression at a high-pressure regulator. Hydrogen decompressed to 4 bar or less through a hydrogen supply valve or an injector is supplied to the fuel cell stack. When second decompression is performed using the hydrogen supply valve in the fuel cell system, hydrogen-tightness (e.g., a hydrogen seal) is secured by the starting valve while the amount of hydrogen is adjusted accurately through the hydrogen supply valve.

SUMMARY

Therefore, the present invention provides a fuel supply valve in which a starting valve of the starting valve and a hydrogen supply valve mounted at a fuel supper of a fuel cell system is removed and the amount of hydrogen is adjusted using the hydrogen supply valve, thereby completely securing airtightness at high pressure.

In accordance with one aspect of the present invention, the above and other objects may be accomplished by the provision of a fuel supply valve in which fuel is supplied from a fuel tank to a stack that may include a plunger having a hollow part, and a housing having a cavity formed therein, the cavity accommodating movement of the plunger, wherein a contact area is formed between the housing and the plunger based on the movement of the plunger, and wherein the plunger is pressurized by pressure of fuel introduced to the cavity through the hollow part in the case of formation of the contact area.

In an exemplary embodiment, the plunger may include a bolt plunger that adheres to a valve sheet, and a nut plunger that adheres to the housing to form the contact area, wherein the bolt plunger and the nut plunger may be coupled to each other to form the plunger. In addition, the plunger may have an end having a diameter greater than a smallest diameter of the housing to block the end of the plunger by the housing in the cavity. The contact area may be formed between one end of the plunger and the housing. The fuel supply valve may further include a valve sheet that adheres the plunger to limit fuel flow, wherein adhering between the plunger and the valve sheet and formation of the contact area may be synchronized.

In another exemplary embodiment, the cavity may be formed above an upper end of the plunger in an inner space of the housing. The fuel supply valve may further include a spring formed between the plunger and an opened side of the housing. The plunger may be symmetric with respect to the hollow part and the hollow part may communicate with the cavity through an orifice. In addition, a size of the hollow part may be greater than a size of the orifice. A bushing may be mounted on at least one of inside the housing and outside the plunger and may be formed of one of plastic or coating film.

Further, when fuel is discharged to the stack, movement speed of the plunger may be adjusted by flow velocity of fuel discharged from the cavity through a side flow path. The fuel supply valve may further include a sealing member disposed on at least one of the plunger and the housing, wherein the sealing member may be provided at a point of the plunger or the housing, which corresponds to the contact area.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
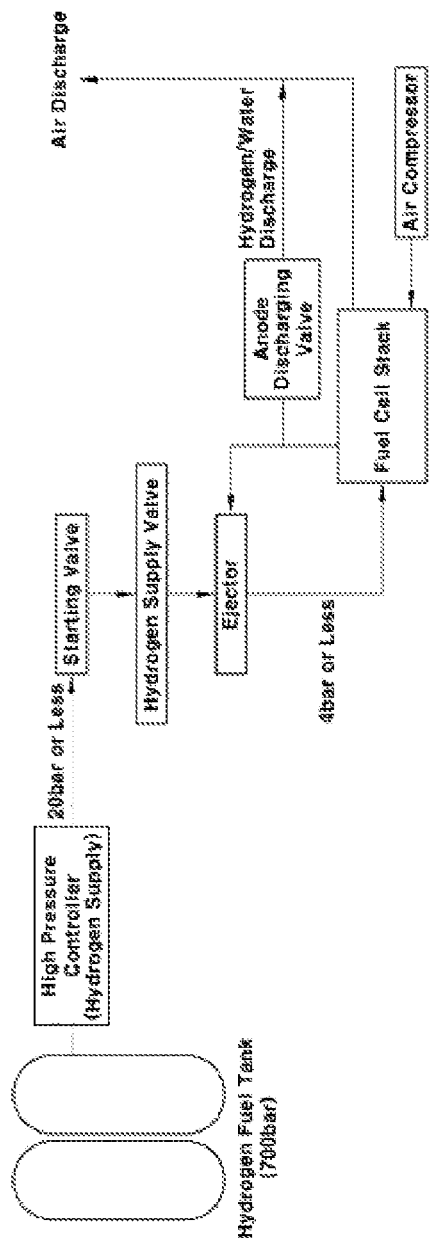
FIG. 1 is a view illustrating a fuel cell system including a starting valve and a fuel supply valve in a fuel supplier according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to accompanying drawings. The present invention includes various applications and modifications and is not limited to the following embodiments. The exemplary embodiments will make the disclosure of the present invention complete, and allow those skilled in the art to completely comprehend the scope of the present invention. Furthermore, throughout the specification, the term " . . . unit" or " . . . module" described herein refers to a unit for processing at least one function or operation, and may be implemented as hardware, software, or a combination of hardware and software.

A fuel cell system mounted within a vehicle mainly includes a fuel cell stack that generates electrical energy, a fuel supply unit that supplies fuel (hydrogen) to the fuel cell stack, an air supply unit that stores oxygen serving as an oxidizer which is necessary for electrochemical reaction at the fuel cell stack, and a cooling system that radiates reaction heat of the fuel cell stack to the outside of the system while adjusting operation temperature of the fuel cell stack.

FIG. 1 is a view schematically illustrating a fuel cell system including two valves and an injector in a fuel supplier according to the related art. The fuel supplier of the fuel cell system may include a high-pressure fuel tank. The high-pressure fuel tank uses hydrogen as fuel and stores hydrogen gas having high pressure of 700 bar as fuel. Since high-pressure fuel is not directly supplied to the stack, high-pressure fuel is decompressed through a high-pressure controller and a valve and is supplied to the fuel cell stack. High-pressure fuel may be decompressed to 20 bar or less using the high-pressure controller in first decompression. The decompressed fuel may be decompressed using the valve or the injector in second decompression. The fuel may be decompressed to 4 bar or less. When second compression is performed by the valve rather than the injector, the valve must have fuel-tightness under pressure of about 20 bar while the amount fuel should be adjusted accurately.

Figure 2:
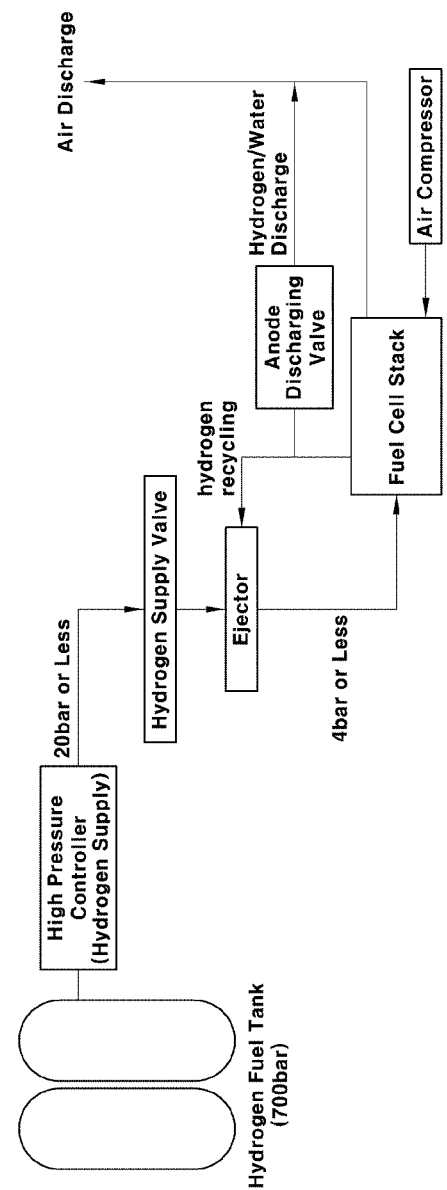
FIG. 2 is a view illustrating a fuel cell system including a fuel supply valve in a fuel supplier according to an exemplary embodiment of the present invention.

Meanwhile, FIG. 2 is a view schematically illustrating a fuel cell system according to an exemplary embodiment of the present invention. In comparison with FIG. 1, in the present invention, a starting valve may be omitted and a structure of a fuel supply valve is improved such that fuel-tightness is secured using the fuel supply valve and the amount of fuel is adjusted more accurately. In other words, the present invention relates to the improved fuel supply valve mounted at the fuel supplier in the fuel cell system.

Figure 3:
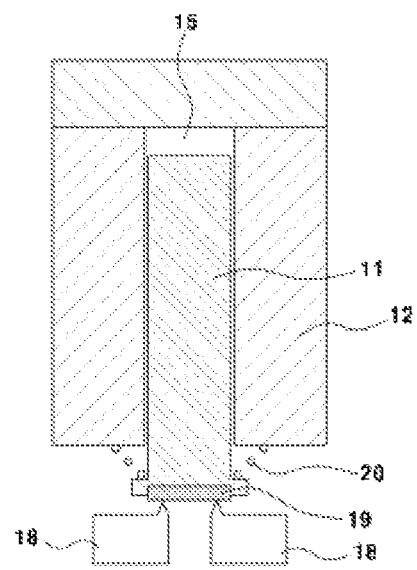
FIG. 3 is a view illustrating the conventional structure of the fuel supply valve according to the related art.

Meanwhile, FIG. 3 is a view illustrating the conventional structure of the fuel supply valve according to the related art. FIG. 3 shows a housing 12, a plunger 11, a spring 20, an absorber 19, and a valve sheet 18 in a general structure of the fuel supply valve. A flow path is formed between valve sheets 18 shown at a lower end of FIG. 3. The flow path is a point where high-pressure fuel is introduced from the fuel tank while extending from the fuel tank. According to the related art, movement of the plunger 11 is adjusted by the spring 20. Accordingly, tightness (e.g., a seal) between the valve sheet 18 and the plunger 11 is maintained by elastic force of the spring 20.

Figure 4:
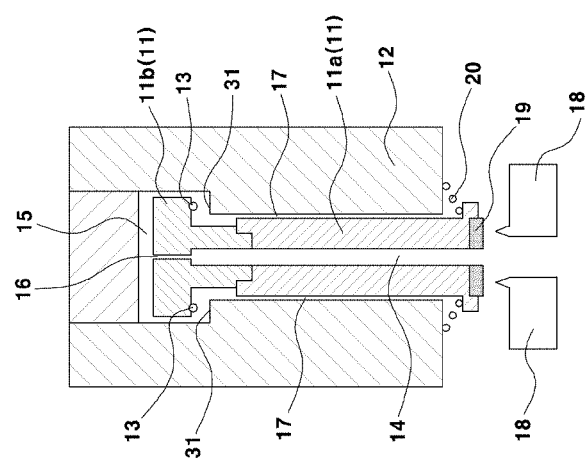
FIG. 4 is a view illustrating a structure of the fuel supply valve in an opened state according to another exemplary embodiment of the present invention.

FIG. 4 is a view illustrating a structure of the fuel supply valve according to an exemplary embodiment of the present invention. The fuel supply valve may be provided to supply fuel from the fuel tank to the stack. In particular, the fuel supply valve may include a plunger 11, a housing 12, a contact area between the plunger 11 and the housing 12, a cavity 15 between the plunger 11 and the housing 12, a spring 20, a valve sheet 18, an absorber 19. The fuel supply valve illustrated in the present invention may include a solenoid valve configured to pen and close of the valve based on various circumstances. FIG. 4 illustrates the fuel tank valve in an "opened" state according to the present invention. The "opened" state of the valve may be an increasing state of the plunger 11 and may indicate that fuel introduced from the fuel tank is supplied to the stack through the valve.

Figure 5:
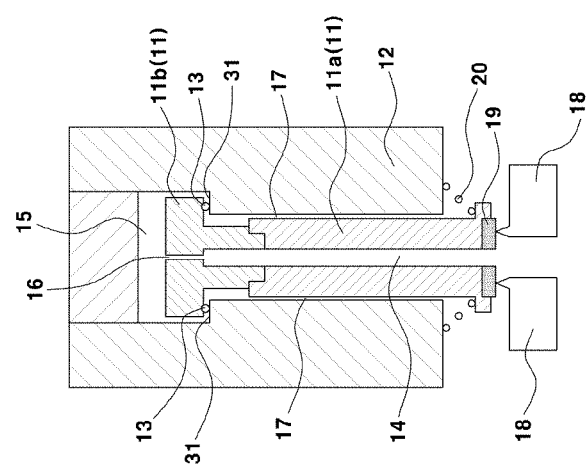
FIG. 5 is a view illustrating a structure of the fuel supply valve in a closed state according to the illustrated exemplary embodiment of the present invention.

FIG. 5 illustrates the fuel tank valve in a "closed" state according to the present invention. The "closed" state of the valve may be an adhering state of the plunger 11 and the valve sheet 18 by the decrease of the plunger 11 and may indicate that fuel introduced from the fuel tank is blocked by the valve not to be supplied to the stack. Hereinafter, referring to FIG. 4, the structure of the fuel supply valve according to the present invention will be described. The fuel supply valve of the present invention may include the housing 12 having an opened side. The housing 12 may form an outer surface of the valve. The plunger 11 may be inserted into the housing 12 through the opened side of the housing 12. In the illustrated exemplary embodiment of the present invention, a coil may be disposed in the housing 12 to apply electromagnetic force to the plunger 11, that is, to transfer the plunger 11.

According to the illustrated exemplary embodiment of the present invention, one side of a lower end of the housing 12 may be opened to allow the cavity 15 to be formed within the housing 12. The plunger 11 may be inserted into the cavity 15. Particularly, the cavity 15 may accommodate the plunger 11 to allow the plunger 11 to move within the cavity. Furthermore, a diameter of an opening of the housing 12 may be maintained constant in an inner direction of the housing 12 until a particular point where the diameter increases, thus forming a step 31 at the point of increase at an inner space of the housing 12. A diameter of the inserted plunger 11 may correspond to the diameter of the opening of the housing 12. In particular, the diameter of the plunger 11 may be maintained constant in a longitudinal direction thereof and may be increased at a point passing through the step 31 in the housing 12. In other words, according to the illustrated exemplary embodiment of the present invention, the opening of the housing 12 may form two hollow cylinder-type spaces having different diameters in the housing 12.

In addition, the housing 12 may include a housing bolt and a housing nut. Although there are no separate reference numerals in the drawings, a configuration distinguished by a slash part (e.g., diagonal lines) at an upper end of the housing 12 in FIGS. 4 to 6 may be the housing bolt. The housing bolt may engage with the housing nut at an upper end of the housing bolt to form the housing 12. In other words, the housing bolt may be disposed at an upper part of the housing 12 to correspond to a largest diameter of internal diameters of the housing 12 and form the appearance of the housing 12.

In addition, the housing bolt and the housing nut may engage with each other in various manners such as a screwing manner, a stationary fit manner, or a general coupling manner. In the present invention, the housing bolt and the housing nut in the housing 12 are separable (capable of being separated) to simplify the insertion of the plunger 11 when the plunger 11 having an "I" shape is inserted into the housing 12. In other words, when the plunger 11 having the "I" shape includes a bolt plunger 11a and a nut plunger 11b which are bisected, the nut plunger 11b having a "T" shape while forming an upper part of the plunger 11 may be inserted into the housing nut in which the housing bolt is separated and the cylindrical housing nut has an opened upper part. An end of the nut plunger 11b protrudes from both sides thereof to have a "T" shape to allow the nut plunger 11b to be inserted until the nut plunger 11b is blocked by the step 31 in the housing 12.

Furthermore, the plunger 11 may be formed to have two cylindrical shapes having different diameters. Particularly, the plunger 11 may protrude at a point passing through the step 31 formed in the housing 12, in a widthwise direction. Since the diameter of the plunger 11 is greater than the internal diameter of the housing opening at the step 31, when the plunger 11 descends in the opening, the protruding end of the plunger 11 (e.g., a first end of the plunger) may be blocked at the step 31 in the housing 12 (e.g., further movement of the plunger may be restricted due to the formation of the step). Meanwhile, the other end of the plunger 11 (e.g., a second end of the plunger) opposite to the protruding end of the plunger 11 in the housing 12 may be extraneously exposed. A diameter of the second end of the plunger 11 may be increased at a certain point similar to the protruding end of the plunger 11. In other words, the plunger 11 may be formed to have an "I" shape according to an exemplary embodiment of the present invention.

According to another exemplary embodiment of the present invention, the plunger 11 may include the nut plunger 11b and the bolt plunger 11a. The bolt plunger 11a may have a lower end with a diameter greater than a diameter of a body of the bolt plunger 11a while the body may be formed lengthwise to have a cylindrical shape. In addition, the lower end of the bolt plunger 11a may repeat contact and separation with the valve sheet 18 through vertical movement. The absorber 19 of the lower end of the bolt plunger 11a may repeat contact and separation with the valve sheet 18. In other words, the bolt plunger 11a may be formed to have an "inverted T" shape.

In the nut plunger 11b, a first side of the nut plunger 11b may be coupled to the bolt plunger 11a and a second side of the nut plunger 11b may be formed to have a diameter greater than a diameter of first side the nut plunger 11b and thus, the nut plunger 11b may protrude in a widthwise direction. In other words, the nut plunger 11b may be formed to have a "T" shape. Thus, the nut plunger 11b and the bolt plunger 11b may be coupled to have an "I" shape. Accordingly, when the plunger 11 descends, the protruding end of the nut plunger 11b may be blocked by the step 31 in the housing 12. The bolt plunger 11a and the nut plunger 11b may be coupled in a general screwing manner using a groove and a screw or in a stationary fit manner, to form the plunger 11. Furthermore, any manner in which the bolt plunger 11a and the nut plunger 11b are coupled to move together may be applied.

Meanwhile, the plunger 11 inserted in the housing 12 may only be in contact with one side of the housing opening. In other words, a longitudinal length of the plunger 11 inserted in the housing 12 may be formed to be less than a longitudinal length of the housing opening. Furthermore, a widthwise length of the plunger 11 may be less than a widthwise length of the hosing 12 and thus, the plunger 11 may be spaced from an inner surface of the housing 12. Thus, the cavity 15 may be formed between the plunger 11 and the housing 12. In other words, when the valve is in an "opening" state, the plunger 11 may be spaced from the inner surface of the housing 12 in all directions. When the valve is in a "closing" state or a changing state to the "closing" state, the plunger 11 may be in descending state or may descend such that the protruding end of the plunger 11 may be blocked by the step 31 of the housing opening, as described above.

Further, a part of the plunger 11 having a smallest diameter may be spaced from a part of the housing 12 having a smallest diameter. By separation of the plunger 11 and the housing 12, a gap may be formed between the plunger 11 and the inner surface of the housing 12 while fuel may flow along the gap. A circular gap may be formed to have a difference between a part of the cylindrical plunger 11 having the smallest diameter and a part of the cylindrical housing 12 having the smallest diameter. Hereinafter, a flow path where fuel flows along the circular gap between the plunger 11 and the housing 12 is referred to as a "side flow path 17" for convenience of explanation.

A contact area may be formed at a part where the housing 12 is in contact with the plunger 11. In addition, the contact area may be formed at a part where the protruding end of the plunger 11 disposed on (e.g., in contact with) the step 31 of the housing opening when plunger 11 descends while the plunger 11 is in contact with the housing 12. In other words, the contact area between the housing 12 and the plunger 11 may be formed based on the movement of the plunger 11. When the plunger 11 descends and the protruding end of the plunger 11 is in contact with the housing 12, the contact area may be formed (e.g., the contact between the component is considered the contact area).

Referring to FIG. 5, according to illustrated exemplary embodiment of the present invention, the contact area may be formed between the plunger 11 protruding in a widthwise direction and the housing 12. In other words, the contact area may be formed below the plunger 11 and above the step 31 of the housing 12. The contact area may prevent fuel in the cavity 15 from leaking to the side flow path 17 when the plunger 11 descends or is in a descending state, namely, when the valve is in the "closing" state of the valve or the changing state to the "closing" state. Accordingly, airtightness (e.g., an air seal) in the cavity 15 may be maintained.

A gap between the plunger 11 and the step 31 of the housing 12 may be filled with a sealing member 13. According to the illustrated exemplary embodiment of the present invention, the sealing member 13 may be disposed at a position that corresponds to the contact area of the plunger 11 and/or the housing 12. When the plunger 11 descends to adhere to the valve sheet 18, the housing 12 adheres to the plunger 11 at the contact area. In particular, the flow of fuel through the contact area may be prevented by the sealing member 13 at the contact area between the plunger 11 and housing 12.

In addition, the sealing member 13 may be formed of a material having elasticity such as a rubber to allow the plunger 11 to adhere to the valve sheet 18 after the sealing member 13 adheres to the housing 12. When the plunger 11 adheres to the valve sheet 18 after the sealing member 13 adheres to the housing 12, the sealing member 13 may be pressurized and, thus, prevention of flow of fuel may be improved through the sealing member 13. In other words, adhesion between the plunger 11 and the valve sheet 18 and formation of the contact area by contact between the plunger 11 and the housing 12 may be synchronized. In the present invention, synchronization indicates that if one event occurs, another event is accompanied, without limitation of the order of the two events.

According to an exemplary embodiment of the present invention, the cavity 15 may be formed above the upper end of the plunger 11 in the inner space of the housing 12 and the side flow path 17 may be formed at the outside of the plunger 11 (e.g., extraneous to the plunger 11). The cavity 15 and the side flow path 17 may be separated by the contact area. When the plunger 11 descends, causing the contact area to seal the cavity 15 and the side flow path 17 to maintain airtightness, the cavity 15 and the side flow path 17 may be separated.

Furthermore, the spring 20 for adhesion of the plunger 11 and the valve sheet 18 may be formed between the plunger 11 and the opened side of the housing 12. When pressure of the flow path where fuel is introduced from the fuel tank and pressure of a flow path discharged to the stack are the same, namely, pressure difference is 0 bar, the spring 20 may provide airtightness between the plunger 11 and the valve sheet 18 (e.g., may maintain the seal between the components). Accordingly, force of the spring 20 may be applied in a direction in which the plunger 11 adhering to the valve sheet 18 and the spring 20 may allow airtightness between the plunger 11 and the valve sheet 18 to be maintained. In an exemplary embodiment of the present invention, the valve sheet 18 may form a flow path that extends from the fuel tank at a center thereof. An upper end of the valve sheet 18 that adheres to the absorber 19 of the plunger 11 may be a sharp point.

Meanwhile, the plunger 11 inserted into the housing 12 may reciprocate in a longitudinal direction of the plunger 11. In other words, the plunger 11 may repeat adhesion or separation with the valve sheet 18 through an up-and-down reciprocating motion. In the vertical reciprocating motion of the plunger 11, when the plunger 11 descends and the plunger 11 adheres to the valve sheet 18, the flow path connected from the fuel tank to the stack may be closed. When the plunger ascends and the plunger 11 is separated from the valve sheet 18, the flow path from the fuel tank to the stack may be opened. The plunger 11 may include the absorber 19 to improve airtightness at a point where the plunger 11 adheres to the valve sheet 18.

In addition, the plunger 11 may include a hollow part 14 that may be formed at a center of the plunger 11 to be parallel to longitudinal direction of the plunger 11. In an exemplary embodiment of the present invention, the plunger 11 may be symmetric with respect to the hollow part 14. The hollow part 14 may communicate with the flow path of the valve sheet 18. Furthermore, an orifice 16 may be formed at an end of the hollow part 14 in a direction along which fuel flows. A size of the hollow part 14 may be greater than a size of the orifice 16. For example, the orifice 16 may have a size through which flow amount of several normal liters per minute (Nl/min) passes at pressure of about 16 bar.

When the valve is maintained in an "opened" state, the plunger 11 may be spaced from the valve sheet 18 to directly introduce fuel passing through the flow path of the valve sheet 18 to the stack. Accordingly, pressure of the hollow part 14, flow path, and cavity 15 may be balanced. When the valve is maintained in a "closed" state, the plunger 11 may adhere to the valve sheet 18 to close the flow path. Accordingly, pressure of the flow path connected to the fuel tank and pressure of the flow path connected to the stack may be different. The flow path of the valve sheet 18 connected to the fuel tank, the hollow part 14, and the cavity 15 may have high pressure and the side flow path 17 and the flow path connected to the stack may be maintained at lower pressure.

Referring to FIG. 3, in the conventional case according to the related art, it is shown that the space between the plunger 11 and the housing 12 is formed to have the same pressure as the flow path connected to the stack, namely, the space and the flow path connected to the stack form a low pressure line. When the flow path is closed, after high-pressure fuel provided from the fuel tank passes through the flow path of the valve sheet 18, fuel may be discharged from the cavity 15 in the housing 15 through the orifice 16 along the hollow part 14 of the plunger 11. Fuel introduced to the cavity 15 after being discharged through the orifice 16 is high-pressure fuel discharged from the flow path connected to the fuel tank. Thus, an inner space of the cavity 15 may be formed to have high pressure.

Furthermore, when the plunger 11 descends to adhere to the housing 12, the housing 12 may adhere to the plunger 11 to maintain the contact area in an airtight state, thereby preventing fuel leakage from the inner space of the cavity 15 to the side flow path 17. Accordingly, although high-pressure fuel introduced from the front end of the valve pushes the plunger 11 in a direction in which the plunger 11 is spaced from the valve sheet 18, the pushing force may counterbalance pressure which pressurizes the plunger 11 at the cavity 15 to maintain airtightness of the plunger 11.

As the inner space of the cavity 15 reaches a high pressure, the inner space of the cavity 15 is pressurized in a radial direction. The plunger 11 may be pressurized in a direction of the opening of the housing 12, namely, in a direction adhering to the valve sheet 18. As the plunger 11 is pressurized, the contact area receives substantial force from the plunger 11 to adhere to the housing 12. Accordingly, the cavity 15 may be disconnected from the side flow path 17. Furthermore, as the plunger 11 pushes the valve sheet with substantial force, when the valve is in the "closed" stated, airtightness (e.g., an airtight seal) between the plunger 11 and the valve sheet 18 may be maintained to seal the flow path between the fuel tank and the stack.

Meanwhile, when the valve is converted to the "opened" state, as the plunger 11 ascends, the high pressure states in the hollow part 14 and the cavity 15 may be released. In addition, as the plunger 11 ascends and the plunger 11 and the valve sheet 18 are separated, the flow path from the fuel tank to the stack may be opened. The majority of the fuel may pass through the flow path of the valve sheet 18 to be supplied to the stack and the remaining fuel at the cavity 15 may be supplied to the stack through the side flow path 17. In the present invention, the flow path may include the flow path where fuel is directly supplied to the stack from the fuel tank through the valve sheet 18 and the flow path where fuel is supplied to the stack through the side flow path 17 after fuel is introduced the hollow part 14, passes through the orifice 16, and is introduced to the cavity 15.

According to an exemplary embodiment of the present invention, since a volume of the side flow path is less than a volume of the cavity 15, flow velocity of the fluid discharged through the side flow path 17 may be high. Furthermore, since a size of the side flow path 17 is less than a size of the hollow part 14, flow velocity of the fluid discharged through the side flow path 17 may be faster than flow velocity of the fluid ascending through the hollow part 14. Since the fluid may be discharged through the side flow path 17 at high velocity, sudden ascending or descending of the plunger 11 may be prevented. As a result, the valve may be controlled more easily and more stably.

In addition, since sudden ascending or descending of the plunger 11 is prevented, opening and separation of the plunger 11 may not suddenly occur thus preventing overshoot due to high pressure of the fuel. Furthermore, as ascending speed of the plunger 11 is decreased, the amount of flow from the fuel tank to the stack may be adjusted more accurately. A disadvantage in the related art regarding difficulty to constantly supply small amounts of fuel may also be remedied.

Figure 6:
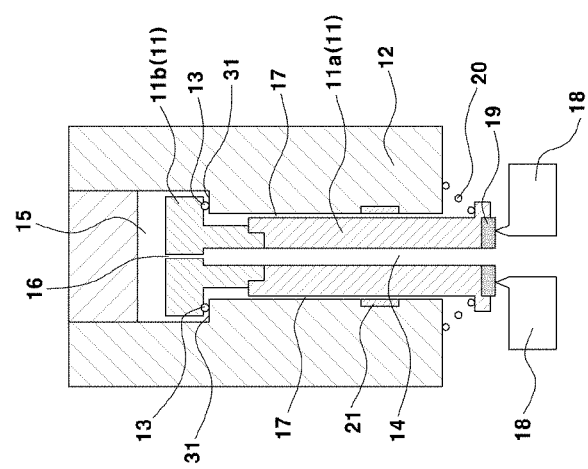
FIG. 6 is a view illustrating a structure additionally including a bushing or a film on a side flow path of the fuel supply valve according to still another exemplary embodiment of the present invention.

FIG. 6 is a view illustrating a structure additionally including a film or a bushing 21 disposed on at least one side of the housing 12 and the plunger 11 on the side flow path 17 according to still another exemplary embodiment of the present invention. When the film or the bushing 21 is formed on the side flow path 17, resistance of the side flow path 21 may be adjusted according to a material, illuminance, area, and thickness of the film or the bushing 21. According to the illustrated exemplary embodiment, the film or the bushing 21 may be formed to correspond to a shape of the side flow path 17. In particular, the film or the bushing 21 may be formed to have a ring shape. As resistance of the side flow path 17 is increased by providing the bushing 21, flow velocity of fuel flowing through the side flow path 17 may be adjusted.

Accordingly, although force for ascending/descending of the plunger 11 is applied, movement speed of the plunger 11 may decrease, in comparison with the case of the side flow path 17 having low resistance. Thus, as resistance of the side flow path 17 is adjusted, ascending/descending speed of the plunger 11 may be adjusted more accurately. The bushing 21 or film including a plastic bushing 21 or a Teflon coating film may be formed inside the housing 12 and/or outside the plunger 11 on the side flow path 17.

As apparent from the above description, in accordance with the present invention, there are advantages as below.

First, fuel-tightness (e.g., an airtight seal) of the valve may be secured at high pressure. Supplied hydrogen having high pressure pressurizes the plunger and tightness of the valve may be maintained by pressure pushing the plunger, thus preventing fuel leakage although pressure of the front end of the flow path is abnormally (e.g., suddenly) increased.

Second, airtightness of the valve is maintained by force of the spring and the structure in the conventional case according to the related art is provided to maintain airtightness by the spring at pressure greater than practical pressure. Accordingly, force of the spring should be very strong and permanent deformation of a rubber material applied to the sealing part often happens. According to the present invention, however, the plunger may maintain airtightness by practical pressure, thereby substantially reducing permanent deformation. Furthermore, since force of the spring is decreased, magnetic force required at the valve may be reduced to minimize required consumption power for movement of the plunger. Thus, a size or shape of the valve may be reduced. In addition, since a diameter of the contact area is greater than a size of the absorber, the total contact area between the plunger and the valve sheet may increase. Thus, impulse according to adhesion and separation of the plunger and the valve sheet may be dispersed to the absorber and the contact area to thus reduce noise and improve durability.

Third, it may be possible to achieve airtightness and more accurate adjustment using a single valve. Since one valve is applied, production costs may be reduced and the entire system may be simplified, thereby securing package efficiency.

Fourth, as fuel is rapidly discharged to the flow path between the plunger and the housing, movement speed of the plunger is reduced. Accordingly, the plunger movement may be adjusted more accurately.

Lastly, overshoot due to introduction of high-pressure fuel may be prevented. Since the plunger may be adjusted more accurately, overshoot into which fuel is excessively introduced may be prevented.

As described above, exemplary embodiments have been disclosed in this specification and the accompanying drawings. Although specific terms are used herein, they are just used for describing the present invention, but do not limit the meanings and the scope of the present invention disclosed in the claims.

Namely, since a high-pressure line formed from the fuel tank extends to the upper part of the plunger 11, the plunger 11 may be pressurized in a direction sealing the flow path by high pressure of fuel. As a result, when the valve is "closed", the flow path may be sealed more easily. Accordingly, a person having ordinary knowledge in the technical field of the present invention will appreciate that various modifications and other equivalent exemplary embodiments can be derived from the exemplary embodiments of the present invention. Therefore, the scope of true technical protection of the present invention should be defined by the technical idea of the appended claims.

What is claimed is:

1. A fuel supply valve in which fuel is supplied from a fuel tank to a stack, comprising:

a plunger having a hollow part and an orifice, wherein the hollow part and the orifice are together formed along entirety of a central longitudinal axis of the plunger and wherein the plunger has a cylindrical shape; and a housing having a cavity formed therein, wherein the cavity accommodates movement of the plunger and wherein the housing has a cylindrical shape, wherein a contact area is formed between the housing and the plunger based on the movement of the plunger, wherein the plunger is pressurized by pressure of fuel introduced to the cavity through the hollow part when the contact area is formed, and wherein, a circular gap forms a side flow path along the cavity of the housing through the entire circular gap between a step formed at a point of increase at an inner space of the housing adjacent to a first end of the plunger and an opening of the housing at second end of the plunger such that when fuel is discharged to the stack, the movement speed of the plunger is adjusted by flow velocity of fuel discharged from the cavity through the side flow path.

2. The fuel supply valve according to claim 1, wherein the plunger includes:

a bolt plunger that contacts a valve sheet; and a nut plunger that contacts the housing to form the contact area, wherein the bolt plunger and the nut plunger are coupled to each other to form the plunger.

3. The fuel supply valve according to claim 1, wherein the plunger has an end having a diameter greater than a smallest diameter of the housing and the end of the plunger is blocked by the housing in the cavity.

4. The fuel supply valve according to claim 3, wherein the contact area is formed between the end of the plunger and the housing.

5. The fuel supply valve according to claim 1, further comprising a valve sheet that adheres the plunger to block fuel flow, wherein adhering between the plunger and the valve sheet and formation of the contact area are synchronized.

6. The fuel supply valve according to claim 1, wherein the cavity is formed above an upper end of the plunger in an inner space of the housing.

7. The fuel supply valve according to claim 1, further comprising:

a spring disposed between the plunger and an opened side of the housing.

8. The fuel supply valve according to claim 1, wherein the plunger is symmetric with respect to the hollow part.

9. The fuel supply valve according to claim 1, wherein the hollow part communicates with the cavity through the orifice.

10. The fuel supply valve according to claim 9, wherein a size of the hollow part is greater than a size of the orifice.

11. The fuel supply valve according to claim 1, wherein a bushing is mounted on at least one of inside the housing and outside the plunger.

12. The fuel supply valve according to claim 11, wherein the bushing is formed of a plastic or a coating film.

13. The fuel supply valve according to claim 1, further comprising:

a sealing member disposed on at least one of the plunger and the housing, wherein the sealing member is disposed at a point of the plunger or the housing, which corresponds to the contact area.

14. The fuel supply valve according to claim 1, wherein the side flow path is configured such that fuel flows along the circular gap between the plunger and the housing.

15. A fuel supply valve system in which fuel is supplied from a fuel tank to a stack, comprising:

a plunger having a hollow part communicated with a cavity through an orifice, wherein the hollow part and the orifice together are formed along an entirety of a central longitudinal axis of the plunger and wherein the plunger has a cylindrical shape;

a housing having the cavity formed therein, wherein the cavity accommodates movement of the plunger and wherein the housing has a cylindrical shape;

a flow path that includes a first flow path where fuel is directly supplied to the stack from the fuel tank through a valve sheet and a second flow path where fuel is supplied to the stack through a side flow path after fuel is introduced in the hollow part, passes through the orifice, and is introduced to the cavity; and a spring disposed between the plunger and an opened side of the housing, wherein a contact area is formed between the housing and the plunger based on the movement of the plunger, wherein the plunger is pressurized by pressure of fuel introduced to the cavity through the hollow part when the contact area is formed, and wherein a circular gap forms a side flow path along the cavity of the housing through the entire circular gap between a step formed at a point of increase at an inner space of the housing adjacent to a first end of the plunger and opening of the housing at a second end of the plunger such that when fuel is discharged to the stack, the movement speed of the plunger is adjusted by flow velocity of fuel discharged from the cavity through the side flow path.

16. The fuel supply valve system according to claim 15, where the side flow path is configured such that fuel flows along the circular gap between the plunger and the housing.

* * * * *